United States Patent [19]

Valley

[11] Patent Number: 4,493,085
[45] Date of Patent: Jan. 8, 1985

[54] AGILE BEAM LASER

[75] Inventor: George C. Valley, Los Angeles, Calif.

[73] Assignee: Hughes Aircraft Company, El Segundo, Calif.

[21] Appl. No.: 379,588

[22] Filed: May 19, 1982

[51] Int. Cl.³ .................. H01S 3/00; H01S 3/098
[52] U.S. Cl. .................. 372/19; 350/355; 372/24; 372/99; 372/105; 372/106
[58] Field of Search .............. 372/24, 19, 21, 99, 372/108, 105, 106; 350/355, 356, 353, 354

[56] References Cited

U.S. PATENT DOCUMENTS 3,509,488  4/1970  Myers et al. .................. 372/24
3,753,151  8/1973  Schulten ...................... 372/24
4,233,571  11/1980  Wang et al. .................. 372/19

OTHER PUBLICATIONS

Myers, "Fast Electron Beam Scanlaser", *IEEE Journal of Quantum Electronics,* vol. QE-4, No. 6, Jun. 1968, pp. 408–411.
Pole et al., "Electron Beam Scanlaser", *IEEE Journal of Quantum Electronics*", vol. 2, Jul. 1966, pp. 182–184.
Giuliano, Applications of Optical Phase Conjugation", *Physics Today,* Apr. 1981.
Lind et al., "Demonstration . . . Phase Conjugate Mirror", *Optics Letters,* vol. 6, No. 11, Nov. 1981, pp. 554–556.
Lesnik et al., "Laser with a Stimulated-Brillion-Scattering Complex-Conjugate Mirror", *Sov. Phys. Tech. Phys.,* 24 (10), Oct. 1979, pp. 1249–1250.
Feinberg et al., "Phase-Conjugating Mirror with Continuous-Wave Gain", *Optics Letters,* vol. 5, No. 12, Dec. 1980, pp. 519–521.

*Primary Examiner*—James W. Davie
*Attorney, Agent, or Firm*—Gregory D. Ogrod; David W. Collins; Anthony W. Karambelas

[57] ABSTRACT

A laser system for providing a rapidly steerable laser output beam. The laser system includes a phase conjugate reflector, laser gain medium and its associated pump source, an output coupling device, and an optical element which selectably controls the transverse lasing mode of the laser system. The components are arranged to form a laser oscillator between the phase conjugate reflector and the optical device, and is operated in such a manner that each selected transverse mode of laser operation generates an output beam from the system which has a different wavefront tilt. Accordingly, the output beam is steerable and is dependent upon the selected transverse mode which is currently lasing in the oscillator.

14 Claims, 5 Drawing Figures

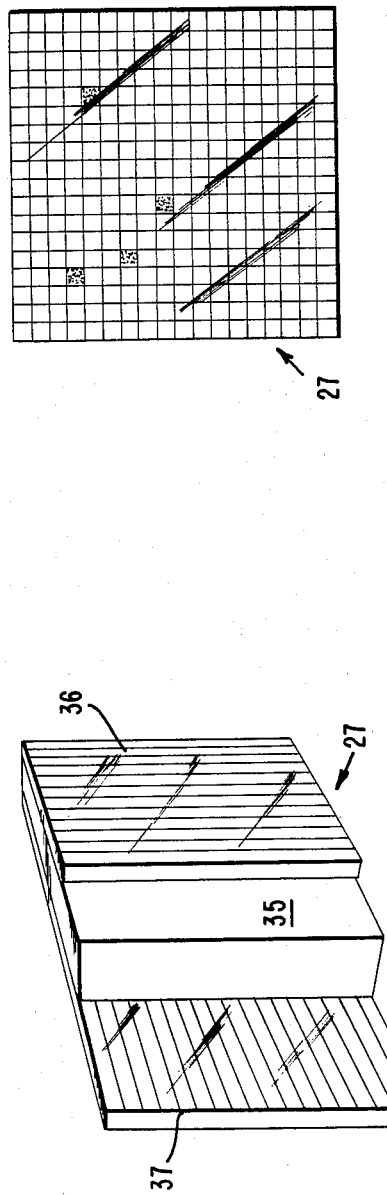
Fig. 3b.
Fig. 3a.
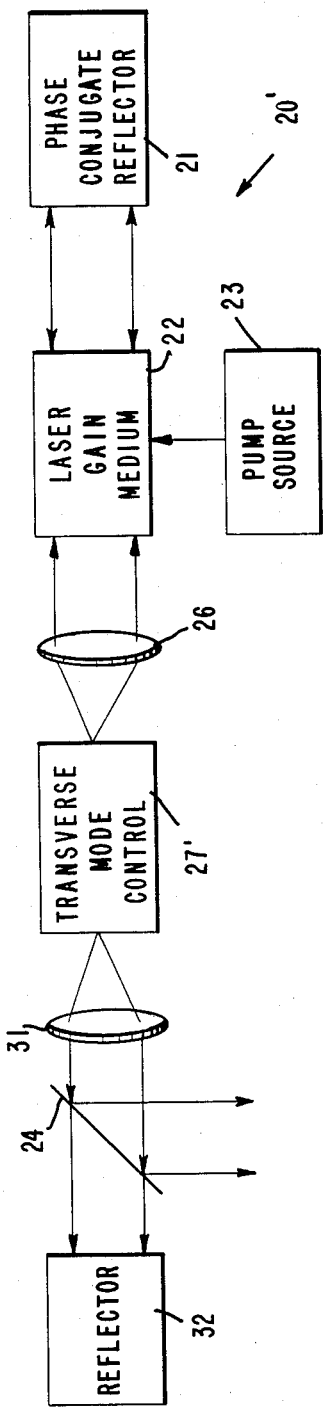
Fig. 4.

AGILE BEAM LASER

BACKGROUND

The present invention relates generally to laser systems employing phase conjugation processes (phase conjugate lasers), and more particularly to phase conjugate lasers whose output beam is electronically steerable.

Conventional laser systems which provide for a steerable laser beam have generally used conventional optical steering methods such as those employing movable mirrors with servo drives. Such systems are generally limited in scan frequency to about a few thousand hertz. In addition to relatively slow steering speed, the size of the field of view has generally been limited and the efficiency of the laster transmitter has been impaired. Also, time delays required to scan from one part of the field-of-view to another may be longer than milliseconds.

Other beam pointing techniques have involved the use of multiple lasers. However, this approach sacrifices scanning power. Also, a multi-channel conventional laser, such as a scanlaser, does not extract power efficiently from the laser gain medium. Scanlaser systems are described in publication entitled "Fast Electron Beam Scanlaser" by R. A. Myers, IEEE Journal of Quantum Electronics, Vol. QE-4, No. 6, June 1968, and "Electron Beam Scanlaser" by R. V. Pole et al, IEEE Journal of Quantum Electronics, Vol. 2, July 1966.

Therefore, it would be an improvement to the laser art to have a laser system whose output beam is electronically steerable in a random, but controlled, manner at relatively high speeds within a wide field-of-view, while preserving a high-quality, full-power beam.

SUMMARY OF THE INVENTION

In order to overcome the deficiencies in the prior art, the present invention utilizes phase conjugation principles to provide for a steerable laser beam having good beam quality. The present invention employs the use of a phase conjugate reflector which reflects laser energy that is the phase conjugate of energy incident thereupon. The phase conjugate reflector is utilized as one end mirror of a laser resonator. An electronically controlled optical device is employed as the second mirror element of the laser resonator. The optical device provides for a plurality of selectable transverse lasing modes to exist in the laser resonator. Each of the transverse lasing modes have a predetermined wavefront tilt in the near field of the laser resonator. A laser gain medium and its associated pump source are disposed between the optical device and the phase conjugate reflector for providing the laser energy which is reflected inn the resonator. An output coupling device is disposed adjacent to the optical device in the near field for coupling a portion of the laser energy out of the laser system as an output beam.

The optical device may comprise a focusing lens and a mirror located at the focal plane of the lens. The mirror is one whose dimension is approximately one diffraction spot in size, and whose transverse location in the focal plane is electronically controlled to control wavefront tilt. By selectively controlling the position of the reflecting surface, different transverse modes of the laser will lase between the phase conjugate reflector and the mirror in the optical device. Selective control over the transverse mode which is lasing in the resonator results in a steerable output beam whose position in the far field is determined by the location of the mirror in the focal plane of the optical device.

A second embodiment of the optical device contemplates the use of an electronically controllable spatial filter disposed between lenses and a reflective element disposed as the second end mirror of the resonator. The spatial filter is controlled to transmit light to the reflective element in the same manner as the first embodiment controls the reflective surface. The spatial filter transmits light at a plurality of locations along the transverse extent thereof, hence allowing the various transverse lasing modes to exist in the resonator.

The laser beam may be rapidly steered within the field-of-view, typically on the order of 10 megahertz. The use of the phase conjugate reflector preserves high laser beam quality and ensures a high-power, diffraction-limited beam.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIGS. 3a and 3b show an embodiment of an optical device for use in the laser of FIG. 1; and FIG. 4 shows a second embodiment of an agile beam laser in accordance with the principles of the present invention.

DETAILED DESCRIPTION

Figure 1:
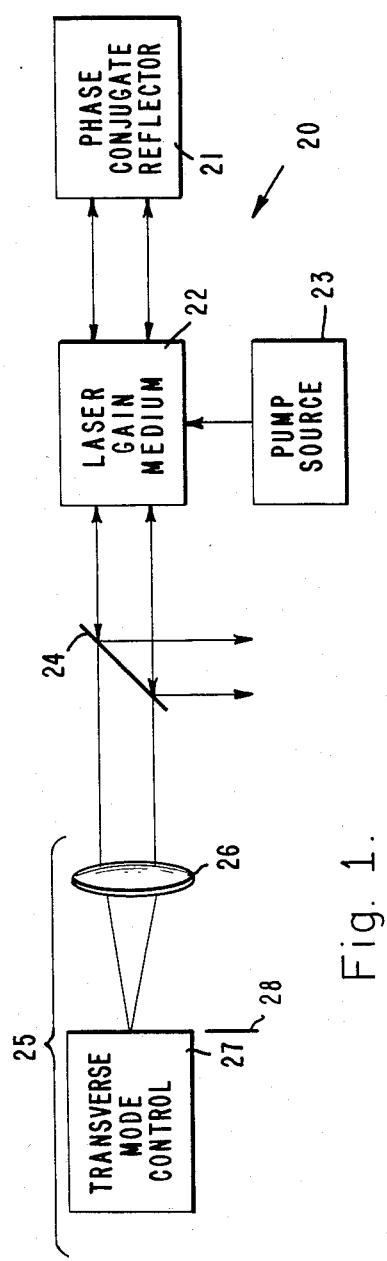
FIG. 1 illustrates an agile beam laser in accordance with the principles of the present invention.

Referring to FIG. 1, there is shown an agile beam laser 20 in accordance with the principles of the present invention. The laser 20 includes a phase conjugate reflector 21, laser gain medium 22 and its associated pump source 23, an output coupling device 24, and an optical device 25 disposed along an optical path to form a laser resonator.

The phase conjugate reflector 21 may be one of a number of phase conjugate devices which are generally known in the art. For example, the reflector may be a device which employs stimulated Brillouin scattering, or four-wave mixing processes, or the like. The principles of phase conjugation are generally well-known in the art and are discussed in numerous publications. A general discussion of optical phase conjugation may be found in a publication entitled "Applications of Optical Phase Conjugation", by Concetto R. Giuliano, Physics Today, April 1981; U.S. Pat. No. 4,233,571, entitled "Laser Having a Nonlinear Phase Conjugating Reflector"; "Demonstration of the Longitudinal Modes and Aberration-Correction Properties of a Continuous Waveguide Laser With a Phase Conjugate Mirror", R. C. Lind et al, Optics Letters, Vol. 6, No. 11, November 1981; and "Laser with a Stimulated Brillouin Scattering Complex Conjugate Mirror" by S. A. Lesnik et al, Sov. Phys. Tech. Phys., Vol. 24, No. 10, October 1979.

The laser gain medium 22 and its associated pump source 23 may be any conventional lasing medium which is compatible with the phase conjugate reflector 21. For example, the Giuliano publication includes a table listing a variety of lasing media, phase conjugating media and phase conjugation processes which may be utilized in the present invention. The output coupling device 24 may be any conventional device such as a partially reflecting mirror arrangement, or a beamsplitter, or the like.

The optical device 25 comprises a focusing element 26, such as a lens, or the like, and a transverse mode control device 27. The focusing element 26 is designed to focus laser energy at a focal plane 28 where the transverse mode control device 27 is located.

The transverse mode control device 27 in this embodiment is a reflecting surface which conforms to the focal plane of the focusing element 26, and which may be electronically controlled so that a portion, or portions, of the device 27 may be made to reflect at any one time. The transverse mode control device 27 is designed so that a reflective spot on the order of the diffraction limit of the laser 20 is made to reflect laser energy. The device 27 may be electronically controlled so that the position of the reflective spot is moved in the focal plane 28 hence creating a plurality of transverse lasing modes in the laser 20.

Figure 2:
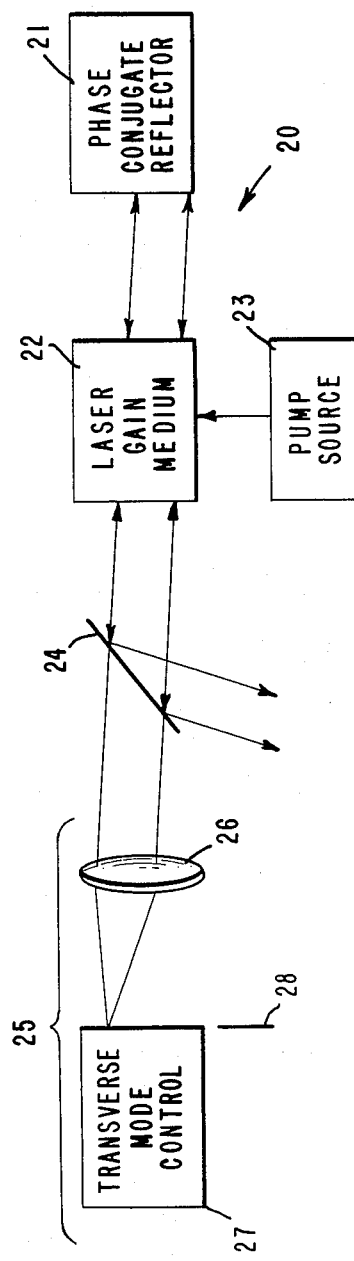
FIG. 2 illustrates the laser of FIG. 1 in which an off-axis transverse mode has been selected.

FIG. 2 shows the system of FIG. 1 operating in a second transverse lasing mode. Laser light at this second transverse mode is made to lase between the transverse mode control device 27 and the phase conjugate reflector 21. Since the point of focus of the focusing element 26 is off the optical axis of the system, the collimated beam to the right thereof, which is representative of the near field, has a tilt associated therewith. Accordingly the output beam of the laser 20 has substantially the same tilt.

One embodiment of the transverse mode control device 27 is shown in FIG. 3a. A device may be comprised of a potassium dihydrogen phosphate (KDP) slab 35 which has a plurality of transparent electrodes 36 coated on the front surface thereof. These transparent electrodes 36 are in the form of vertical strips and may be comprised of indium tin oxide (ITO), or the like. In addition, the rear surface of the KDP slab 35 is coated with a plurality of reflective electrodes 37. These reflective electrodes 37 may be made of silver, or the like, and are deposited in a horizontal configuration.

The transparent electrodes 36 may be biased at a value of $V_\pi/8$ and the reflective electrodes 37 at $-V_\pi/8$, where $V_\pi$ is the voltage necessary for polarization rotation by 180°. By applying a voltage of approximately 375 volts across selected horizontal and vertical electrodes, the KDP slab 35 may be made to transmit polarized light in a localized area. Accordingly, laser light may be transmitted through the transparent electrodes 36 and KDP slab 35 and hence reflected from the reflective electrodes 37. Accordingly, in referring to FIG. 3b, this arrangement may be electronically scanned to produce one or more reflective locations at the focal plane 28 of the system of FIG. 1. Laser light will thus be reflected to create the desired transverse mode operation of the laser 20. Several reflective spots are shown in FIG. 3b identified by the stippled areas.

It is known in the art that a phase conjugate resonator will oscillate off the brightest reflective surface encountered by a reflected wave from the phase conjugate reflector. This information may be found in an article by J. Feinberg et al entitled "Phase Conjugating Mirror with Continuous Wave Gain", Optics Letters, Vol. 5, No. 12, December 1980.

Another mechanism for creating an electronically controlled reflective surface is described in several publications dealing with electron beam scanlaser systems. One publication is entitled "Fast Electron Beam Scanlaser" by R. A. Myers, IEEE Journal of Quantum Electronics, Vol. QE-4 No. 6, June 1968, and another publication is entitled "Electron Beam Scanlaser" by R. V. Pole et al, IEEE Journal of Quantum Electronics, Vol. 2, July 1966. The scanlaser device employs a scanning electron beam, a layer of photo-refractive material, such as KDP, backed by a plane mirror and fronted by a quartz plate and polarizer. The electron beam is used to modify the birefringence of the KDP at a localized spot such that the KDP birefringence at the spot exactly cancels the birefringence of the quartz. This allows polarized light from the resonator to be reflected from the mirror.

One other method of creating an electronically controlled reflective surface is known in the art and involves the use of vanadium dioxide as a mirror. The vanadium dioxide is heated to a temperature just below the semiconductor-metal transition temperature thereof. An electron beam is utilized to illuminate the vanadium dioxide and heat the illuminated area above the transistion temperature. Therefore, it becomes a metal and is reflecting. Although this method is feasible, it is uncertain whether temperature fluctuations in the vanadium dioxide can be controlled in a manner which would make this method practical.

Referring to FIG. 4 there is shown a second embodiment of present invention. In this embodiment the transverse mode control device 27' is one which transmits the laser light instead of reflecting it. Accordingly, a second focusing element 31 and plane mirror reflector 32 are required in order to complete the laser resonator. The output coupling device 24 is shown positioned between the second focusing element 31 and plane mirror reflector 32. However, this is not absolutely necessary, and it need only be placed in the optical path at positions where the laser light is collimated, preferably as shown. For example, it may be placed between the first focusing element 26 and laser gain medium 22 as described with reference to FIG. 1.

The operation of this embodiment is substantially the same as the first embodiment except that the transverse mode control device 27' allows the focused light to be transmitted therethrough and hence acts as a spatial filter. This spatial filter is electronically controllable as in the first embodiment. For example, the device shown in FIG. 3a could be utilized except that the rear reflective electrodes 37 would be replaced by transparent electrodes so that the device is transparent to the laser light passing therethrough. It should be clear that the general operation of this embodiment is substantially the same as the first embodiment and in particular the transverse mode control device 27' may be implemented in a variety of ways, some of which have been described hereinabove.

It is to be understood that the above-described embodiments are merely illustrative of some of the many specific embodiments which represents applications of the principles of the present invention. Clearly, numerous and varied other arrangements may be readily devised by those skilled in the art without departing from the spirit and scope of the invention.

What is claimed is:

1. Laser apparatus comprising:

phase conjugate reflecting means for reflecting laser energy which is the phase conjugate of laser energy incident thereupon;

optical means for providing a plurality of selectable transverse lasing modes between said optical means and said phase conjugate reflecting means, each of said plurality of transverse lasing modes having a predetermined wavefront tilt in the near field;

laser gain medium disposed between said optical means and said phase conjugate reflecting means for providing said laser energy which is reflected therebetween;

laser pumping means operatively connected to said lase gain medium for providing excitation energy for said laser medium; and output coupling means disposed adjacent to said optical means in said near field for coupling a portion of said laser energy out of said laser apparatus as an output beam therefrom;

whereby said output beam is steerable in position determined by the particular transverse lasing mode selected by said optical means.

2. The laser apparatus of claim 1 wherein said optical means comprises:

a lens; and an electronically controllable reflective element disposed at the focal plane of said lens, said mirror element having a reflective surface whose transverse location in said focal plane is selectively controlled to produce said plurality of transverse lasing modes.

3. The laser apparatus of claim 1 wherein said optical means comprises:

first and second lenses;

an electronically controllable spatial filter disposed between said first and second lenses at respective focal planes thereof, said spatial filter having a transmissive portion whose transverse locations is selectively controlled to produce said plurality of lasing modes; and a reflecting element disposed adjacent to said second lens for reflecting light transmitted by said spatial filter back through said spatial filter.

4. The laser apparatus of claim 2 wherein said electronically controllable reflective element further comprises:

a slab of electro-optical material;

a first layer of electrodes in the form of parallel strips disposed on a first face of said slab being substantially transparent for said laser energy;

a second layer of electrodes in the form of parallel strips disposed on a second face of said slab which is on the opposite side of said slab from said first face, with the length of said second electrode strips positioned perpendicular to the direction of the length of said first electrode strips, and being substantially 100% reflective for said laser energy; and electrical input means connected to both layers of said strip electrodes for supplying a control voltage to at least one electrode in said first layer and at least one electrode in said second layer for creating at least one localized volume of predetermined polarization within said slab whose dimensions are on the order of a diffraction limited beam, whereby incident radiation is transmitted through said slab to said reflective second electrodes and reflected at an angle dependent upon the planar position of said localized volume of polarization.

5. The laser apparatus of claim 4 wherein said slab of electro-optical material comprises potassium dihydrogen phosphate.

6. The laser apparatus of claim 4 wherein said first electrodes comprise indium tin oxide.

7. The laser apparatus of claim 4 wherein said second electrodes comprise silver.

8. The laser apparatus of claim 2 wherein said electronically controllable reflective element further comprises:

a slab of photo-refractive material;

optically reflective means adjacent to a first side of said slab;

a quartz plate positioned adjacent to a second side of said slab which is on the opposite side of said slab from said reflective means;

polarization means positioned adjacent to said quartz plate on the side of said plate opposite said slab;

an electron beam whose output energy is sufficient to alter the birefringence of the photo-refractive material in said slab over a predetermined volume; and control means for directing said electron beam output energy to positions in said slab such that the birefringence of said slab material is altered so as to compensate for the birefringence of said quartz plate and allow laser energy from said polarization means to be transmitted through said slab and reflected by said reflective means.

9. The laser apparatus of claim 8 wherein said reflective means comprises a plane mirror.

10. The laser apparatus of claim 8 wherein said reflective means comprises a reflective coating of metallic material deposited on said first side of said slab.

11. The laser apparatus of claim 2 wherein said electronically controllable reflective element further comprises:

a planar mirror substrate coated with a layer of vanadium dioxide;

means for heating said mirror substrate to an elevated temperature close to but just below the predetermined semiconductor-metal transition temperature for said vanadium dioxide; and an electron beam whose output beam is programmably directable over the surface of said mirror substrate and has sufficient energy to raise the temperature of said vanadium dioxide in at least one localized area, whose dimensions are on the order of the cross section of a diffraction limited beam for said laser, above the transition temperature whereby a reflective metal exists within said localized area.

12. The laser apparatus of claim 3 wherein said electronically controllable spatial filter further comprises:

a slab of electro-optical material;

a first layer of electrodes in the form of parallel strips disposed on a first face of said slab being substantially transparent for said laser energy;

a second layer of electrodes in the form of parallel strips disposed on a second face of said slab which are on the opposite side of said slab from said first face, with the length of said second electrode strips positioned perpendicular to the direction of said first electrode strips, and being substantially transparent for said laser energy; and electrical input means connected to both layers of said strip electrodes for supplying a control voltage to at least one electrode in said first layer and at least one electrode in said second layer for creating at least one localized volume of predetermined polarization within said slab whose dimensions are on the order of a diffraction limited beam, whereby incident radiation is transmitted through said slab and electrodes at a position dependent upon the planar position of said localized volume of polarization.

13. The laser apparatus of claim 12 wherein said slab of electro-optical material comprises potassium dihydrogen phosphate.

14. The laser apparatus of claim 4 wherein said first and second electrodes comprise indium tin oxide.

* * * * *